(12) United States Patent  
Millirans

(10) Patent No.: US 9,079,061 B1
(45) Date of Patent: Jul. 14, 2015

(54) VEHICLE FOR EXERCISING

(71) Applicant: Matthew S. Millirans, Ada, OH (US)

(72) Inventor: Matthew S. Millirans, Ada, OH (US)

( * ) Notice: Subject to any disclaimer, the term of this patent is extended or adjusted under 35 U.S.C. 154(b) by 0 days.

(21) Appl. No.: 14/035,802

(22) Filed: Sep. 24, 2013

Related U.S. Application Data

(60) Provisional application No. 61/705,454, filed on Sep. 25, 2012.

(51) Int. Cl.
*B62M 1/20* (2006.01)
*A63B 22/00* (2006.01)

(52) U.S. Cl.
CPC .............. *A63B 22/0087* (2013.01); *B62M 1/20* (2013.01)

(58) Field of Classification Search
CPC .............................. A63B 22/0087; B62M 1/20
USPC ......... 280/225, 265, 281, 220, 255, 246, 244, 280/252, 263, 288.4, 293
See application file for complete search history.

(56) References Cited

U.S. PATENT DOCUMENTS

| | | | |
|---|---|---|---|
| 631,531 A | 8/1899 | Sargent | |
| 749,153 A | 1/1904 | Batchelor | |
| 1,500,809 A | 12/1922 | Giufri | |
| 2,012,683 A | 8/1930 | Johnson | |
| 1,845,044 A | 2/1932 | Curry | |
| 4,126,329 A * | 11/1978 | Tchernyak | 280/220 |
| 4,565,365 A * | 1/1986 | Barkhurst | 482/61 |
| 4,632,414 A * | 12/1986 | Ellefson | 280/246 |
| 4,700,962 A | 10/1987 | Salmon | |
| 4,796,907 A | 1/1989 | Geller | |
| 4,941,673 A | 7/1990 | Bennet | |
| 5,354,083 A | 10/1994 | Liu | |
| 5,544,906 A * | 8/1996 | Clapper | 280/288.1 |
| 5,641,108 A * | 6/1997 | Ewer | 224/536 |
| 6,640,979 B1 * | 11/2003 | Mayfield | 211/20 |
| 7,654,545 B1 * | 2/2010 | Millirans | 280/223 |
| 7,946,963 B1 * | 5/2011 | Schreiner | 482/57 |
| 2004/0108683 A1 * | 6/2004 | Oohara | 280/288.4 |
| 2005/0035569 A1 * | 2/2005 | Ikeda et al. | 280/244 |

* cited by examiner

*Primary Examiner* — Joseph Rocca
*Assistant Examiner* — Jacob Knutson
(74) *Attorney, Agent, or Firm* — Jerry Semer

(57) ABSTRACT

This device is exercise equipment that can be used in the home or outside. It is a vehicle that is propelled by arm and leg power. The device is a three wheeled vehicle that driven by the movement of the handlebars and the seat. The rider moves the handlebars and the seat back and forth. The handlebars are attached to the wheels by a set of pulleys. When the handlebars are moved back and forth they drive the wheels. The handle bars and the seat are attached to each other so that both the legs and the arm are exercised. Thus, an individual can ride around the town in his vehicle exercising his whole body. He can also exercise in his home with a stand that holds the drive set of wheels off the floor so that the vehicle will not move.

15 Claims, 13 Drawing Sheets

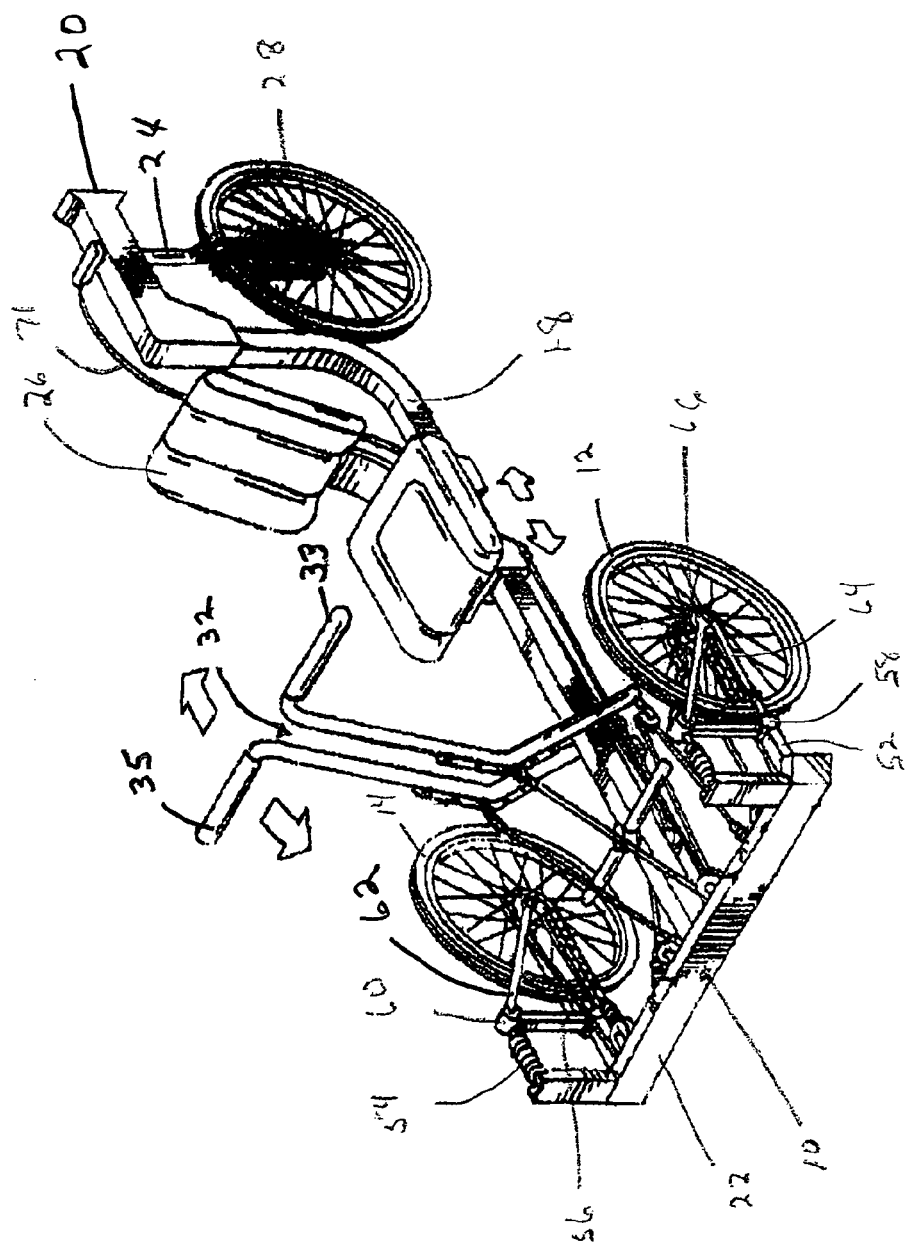

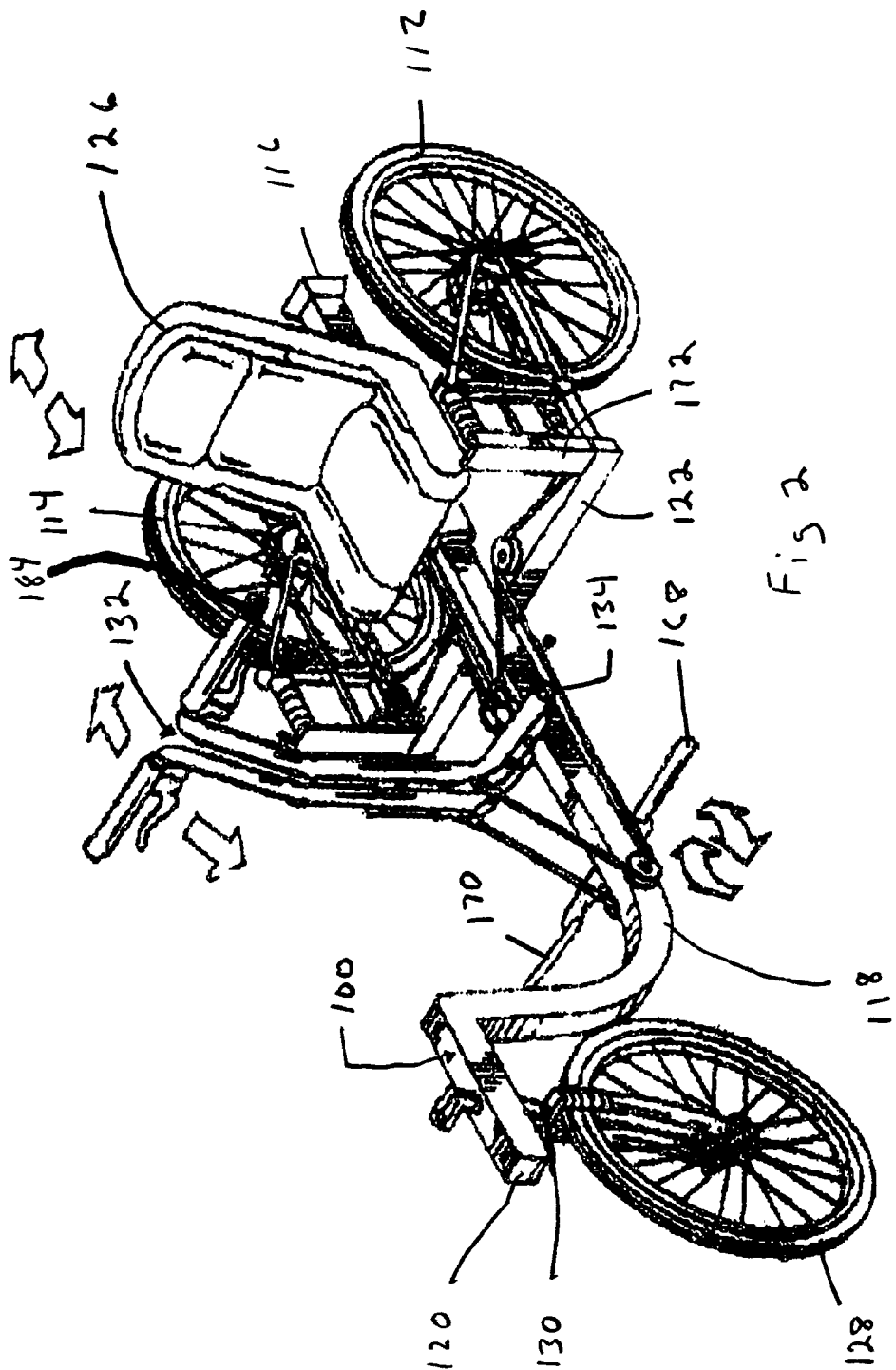

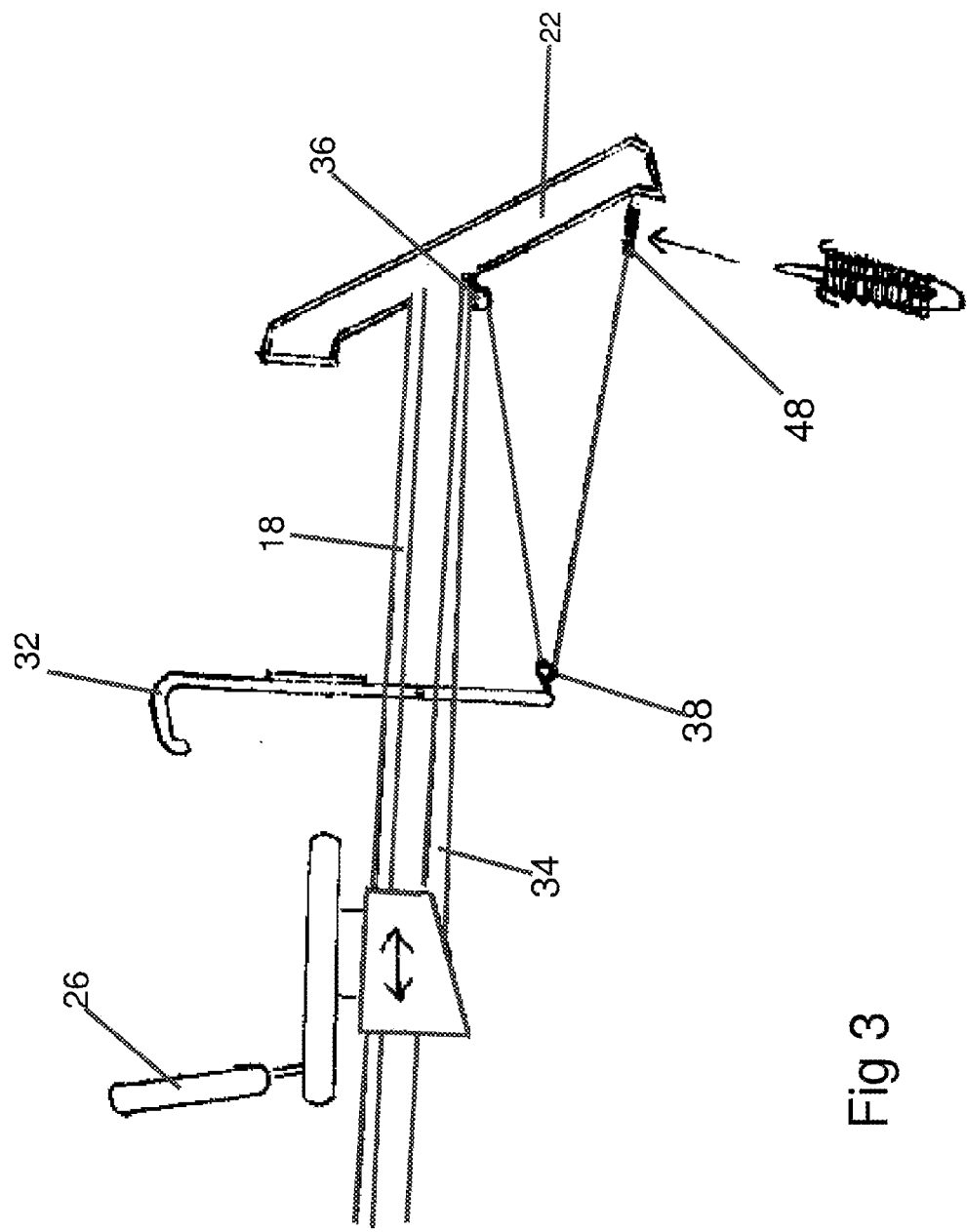

US 9,079,061 B1

VEHICLE FOR EXERCISING

This application is a continuation of prior application No. 61/705,454 filed Sep. 25, 2013.

FIELD OF INVENTION

This invention relates to the field of exercise equipment and more particularly to the field of exercise equipment that can be used to move around and exercise outdoors as well as exercising indoors upon the equipment.

BACKGROUND OF THE INVENTION

People today are living longer. This is somewhat due to the fact that we as a people are exercising more. This is shown on by the fact that there are a great number of patents dealing with exercise equipment. The number of exercise equipment patent has expanded greatly within the last few years. One of the objectives of all exercise equipment is to make exercising fun. Most of us find exercising dull and boring. It is a lot of hard work. Exercise equipment has been designed to make this work more pleasurable. Also individuals use TV iPods, radio, and other devices to help make exercising less tedious. One of the objectives of this invention is to create exercise equipment that makes exercise more pleasurable. To achieve this objective applicant has designed a vehicle that can be ridden outdoors. Although almost all exercise equipment can be used outdoors there are only a few specific pieces that are designed to be used outdoors. These include many sports such as tennis, basketball, baseball, and badminton. But for the individual only calisthenics, running or cycling are exercises done outside. Of all these, the only true piece of exercise equipment is the bicycle. All outdoor exercise for individuals only exercises the legs.

Almost no exercise equipment has been designed to be used both inside and outside. Applicant has designed a piece of exercise equipment that can be used both inside and outside. The equipment gives one the pleasure of riding outside but also the ability to exercise inside in inclement weather.

One of the objectives of this invention is to create a piece of exercise equipment that exercises the whole body. Another objective of the invention is to design a piece of exercise that an individual can use within his home but also have the pleasure to use it outdoors.

The feature that facilitates this invention to accomplish the objective is that it is a vehicle that allows the individual to ride outdoors and also exercise indoors. The vehicle giving a full body workout in that it is a vehicle that exercises both the arms and the legs. The arms are use to drive the vehicle. The movement of the arms back and forth causes wheels to turn on the vehicle. The legs are exercised by the seat moving back and forth.

The feature that enables the invention to be use the invention both indoors and outdoors is that the inventor has developed a stand for the invention that lifts the drive wheels off the floor. This allows the individual to exercise upon the vehicle without the vehicle moving.

SUMMARY OF THE INVENTION

This device is exercise equipment that can be used in the home or outside. It is a vehicle that is propelled by arm and leg power. The device is a three wheeled vehicle that driven by the movement of the handlebars and the seat. The rider moves the handlebars and the seat back and forth. The handlebars are attached to the wheels by a set of pulleys. When the handlebars are moved back and forth they drive the wheels. The handle bars and the seat are attached to each other so that both the legs and the arm are exercised. Thus, an individual can ride around the town in his vehicle exercising his whole body. He can also exercise in his home with a stand that holds the drive set of wheels off the floor so that the vehicle will not move.

BRIEF DESCRIPTION OF THE DRAWINGS

FIG. 1 is a perspective view of one embodiment of the invention.

FIG. 2 is a perspective view of another embodiment of the invention.

FIG. 3 is a view of the system of the seat and handlebar working together of the embodiment of FIG. 1.

DETAILED DESCRIPTION OF THE PREFERRED EMBODIMENT

Figure 1A:
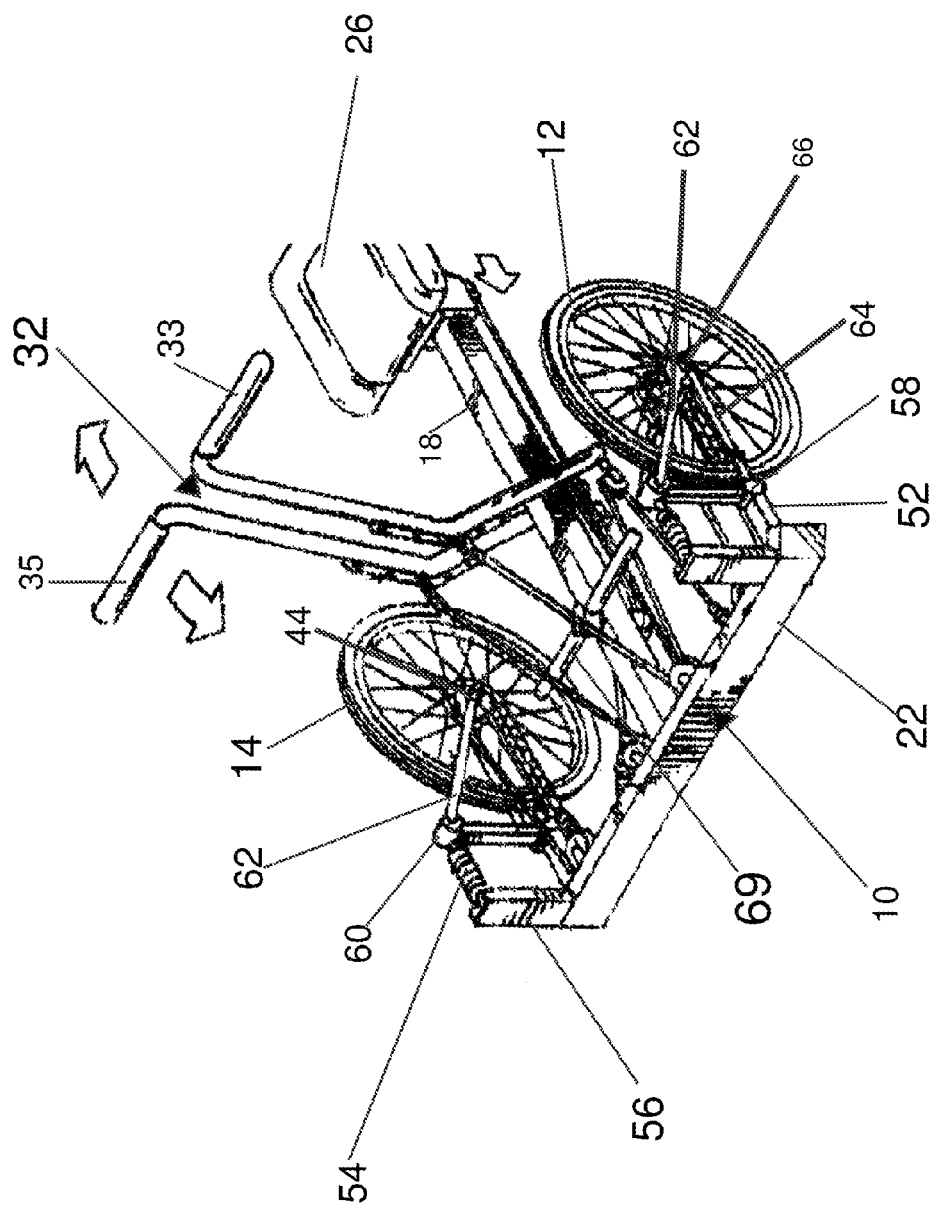
FIG. 1A is a perspective view of the front of the embodiment of FIG. 1.

FIG. 1 is a perspective view of one embodiment of the invention. FIG. 1A is a perspective view of the front of the embodiment of FIG. 1. The invention is a three or four wheeled vehicle that is used for exercise. In this embodiment the invention is a three wheeled vehicle 10. In this embodiment the two wheels 12 and 14 of the three wheeled vehicle are on the front 16. In the center of the three at wheeled vehicle 10 is a rail 18 running from the back 20 to the front 16. On the front 16 of the three wheeled vehicle 10 is a bumper 22 that is mounted perpendicular to the rail 18 at the front of rail 18. Attached to the each end of a bumper 22 at the bottom of the bumper 22 is the front wheel suspension bar 52. Attached to the each end of a bumper 22 at the top of the bumper 22 is the front wheel suspension spring 54. Attached across each the front wheel suspension bar 52 and the front wheel suspension spring 54 is the suspension bearings bar 56. The suspension bearing bars 56 are bars that are attach to suspension bars 52 via a rotating bearings 58. The tops of the suspension bearing bars 56 are attached to suspension springs 54. Attached to the top of suspension bearing bars 56 are hub support bearing 60. To each side of the hub support bearings 60 are attached top hub support pieces 62. Attached to each sides of rotating bearing 58 at the bottom of the suspension bearing bars 56 are the bottom hub support pieces 64. The top hub supports pieces 62 and the bottom hub supports pieces 64 are long tubes. At that end each set of the bottom hub support pieces 64 and the top hub support pieces 62 are attached to hub lugs 66. The suspension bearing bar 56 and the top hub support piece 62 and the bottom hub support piece 64 are attached together such that they form a triangle. The top hub support pieces 62 and the bottom hub support pieces 64 extend out from the sides suspension bearing bars 56. Between the sets of top hub support pieces 62 and bottom hub support pieces 64 the wheel 12 or 14 fits. The wheel hub 44 of wheel 12 or 14 is attached to the 3 wheeled vehicle 10 via the hub lug 66. The front wheels 12 and 14 of the three wheeled vehicle 10 have the above described suspension so that they will lessen bumps and holes the three wheeled vehicle 10 may encounter when an individual is using it for exercise.

Along the rail 18 is a seat 26. Seat 26 is slidably attached to rail 18. As rail 18 approaches the back 20 of the three wheeled vehicle 10 it curves upward over the rear wheel 28. Rear wheel 28 is attached to rail 18 by back wheel fork 24. Back wheel fork 24 extends downward from rail 18 over rear wheel 28 which attaches the wheel 28 to the rail 18.

Figure 1B:
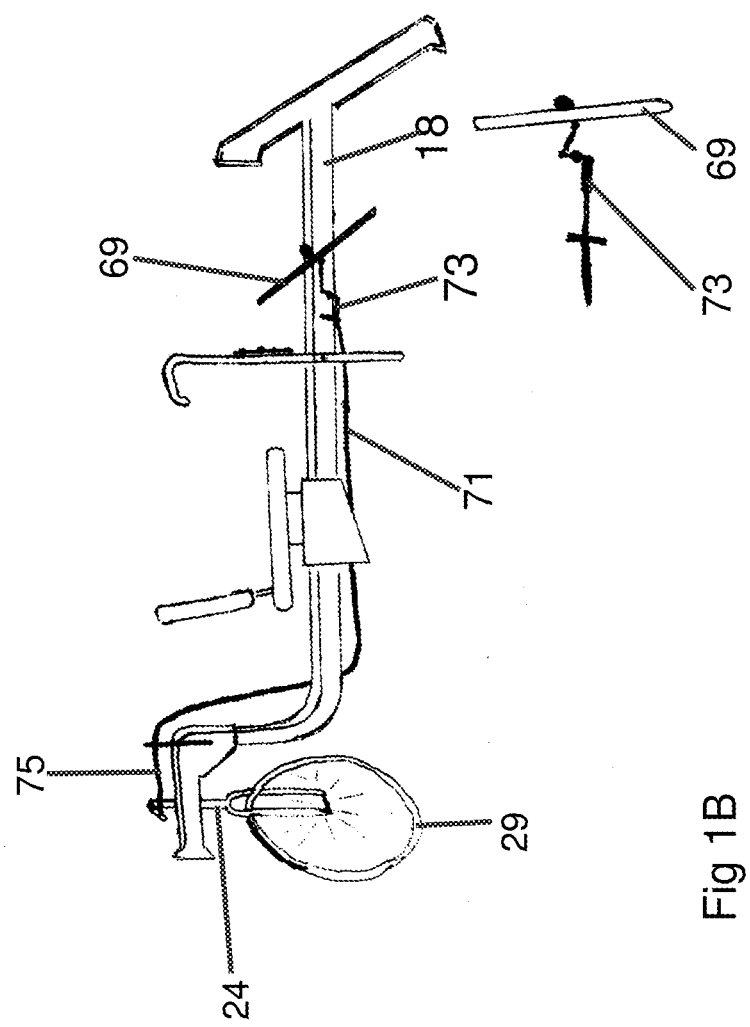
FIG. 1B is a view of the steering system of the embodiment of FIG. 1.

The rear wheel 28 is used for turning. FIG. 1B is a view of the steering system of the embodiment of FIG. 1. An individual riding this embodiment uses his feet for steering. The rider's feet are placed on the foot rest and steering bar 69. The foot rest and steering bar 69 is attached to the rail 18 such that it is able to rotate. When an individual pushes his foot to causes the foot rest and steering bar to rotate the three wheeled vehicle turns in that direction. The foot rest and steering bar 69 is attached to a cable 71 with a clevis 73. When the foot rest and steering bar 69 is rotated the cable 71 rotates due to the clevis 73. The other end of the cable 71 is attached to the wheel fork 24 as shown in FIG. 1B. The other end of the cable 71 also has a clevis 75. Thus when the cable 71 is rotated by the movement of the foot rest and steering bar 69 the other end of the cable 71 will rotate the wheel fork 24 due to the clevis 75. When the wheel fork 24 is rotated the rear wheel 28 rotates or turns.

Figure 2A:
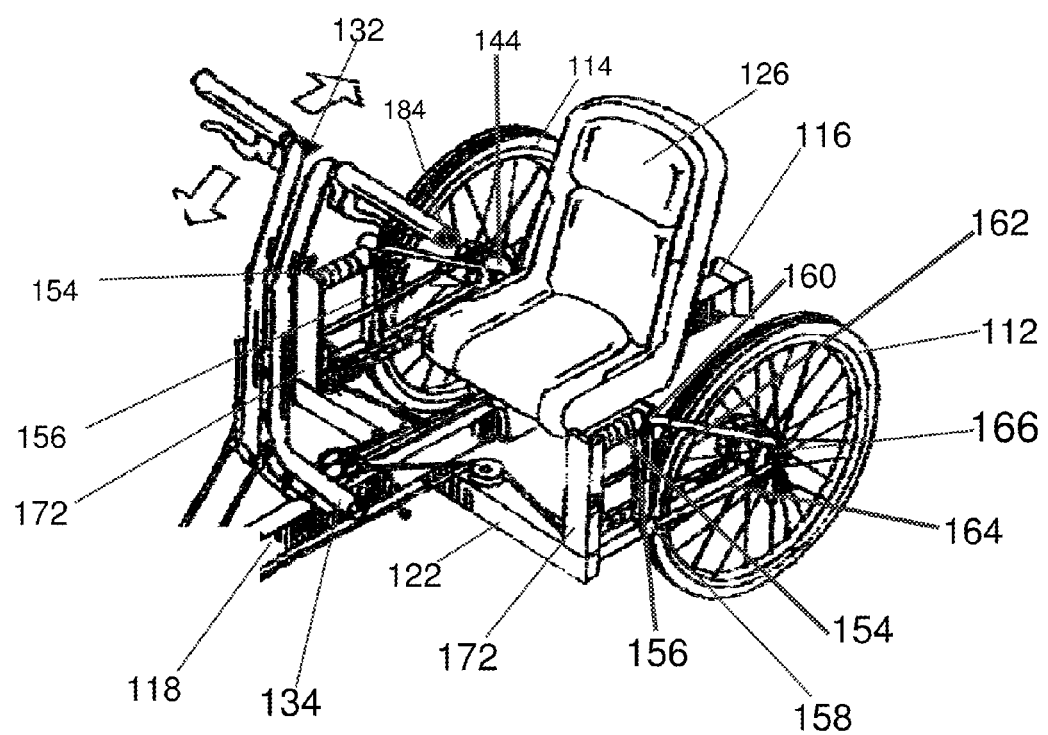
FIG. 2A is a perspective view of the front of the embodiment of FIG. 2.
Figure 5:
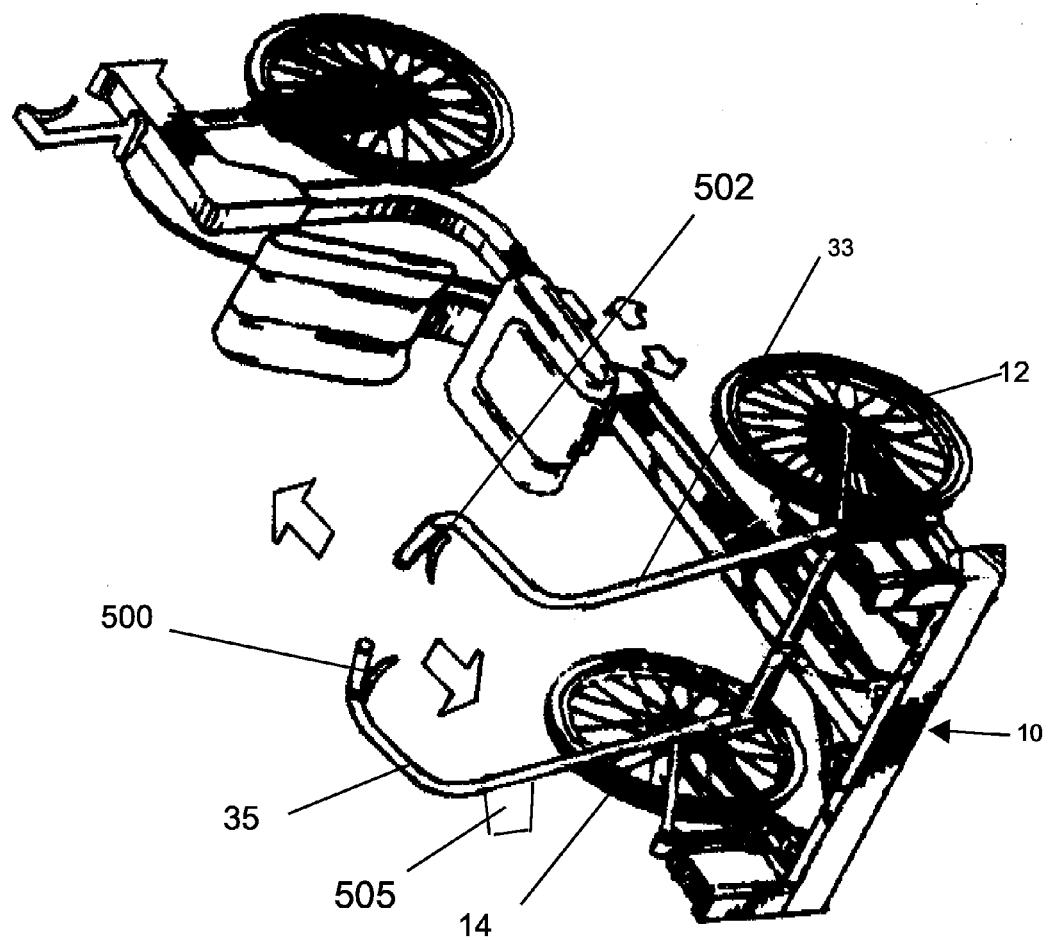
FIG. 5 is a view of an embodiment of the invention showing the handlebars placed outside the rider legs.

Handlebars 33 and 35 make the movable handlebar set 32. In the preferred embodiment the handlebars 33 and 35 are placed outside the legs position as shown in FIG. 5. The handlebars 33 and 35 can be placed inside the legs as shown in FIGS. 1, 1A, and 2A. However applicant has found that by placing the handlebars 33 and 35 inside the leg position can cause problems. The individual riding the vehicle can make contact with one of the bars and be injured. Thus, in the preferred embodiment the handlebars 33 and 35 are placed outside the leg position. Handlebar 33 and 35 work independent of each other. The movable handlebars set 32 are attached to the rail 18 in front of seat 26. The moveable handlebar set 32 are attached such that they can be moved forward towards the front 16 of the three wheel vehicle 10 and backwards towards the back 20 of the three wheel vehicle 10. In the preferred embodiment the moveable handlebar set 32 are attached to the rail 18 by a pivotal bearing 34.

As one rides the vehicle one moves the seat 26 and moveable handlebar set 32 back and forth. FIG. 3 show how the seat 26 and the movable handlebar set 32 are attached by cables to create an exercise device. In FIG. 3 one see that the seat 26 is attach to a seat cable 34. Seat cable 34 run from the seat 26 along the rail 18 to a rail pulley 36 that is attach to the rail 18 just before rail 18 is attached to the bumper 22. The seat cable 34 then turns back and runs through handlebar pulley 38 which is attached to the moveable handlebar set 32. The seat cable 34 than reverses its direction and runs back to the bumper 22 where is hooked to a compression spring 48 which is attached to the bumper 22. This arraignment allows the seat 26 and the moveable handlebar set 32 to work in together.

Figure 4:
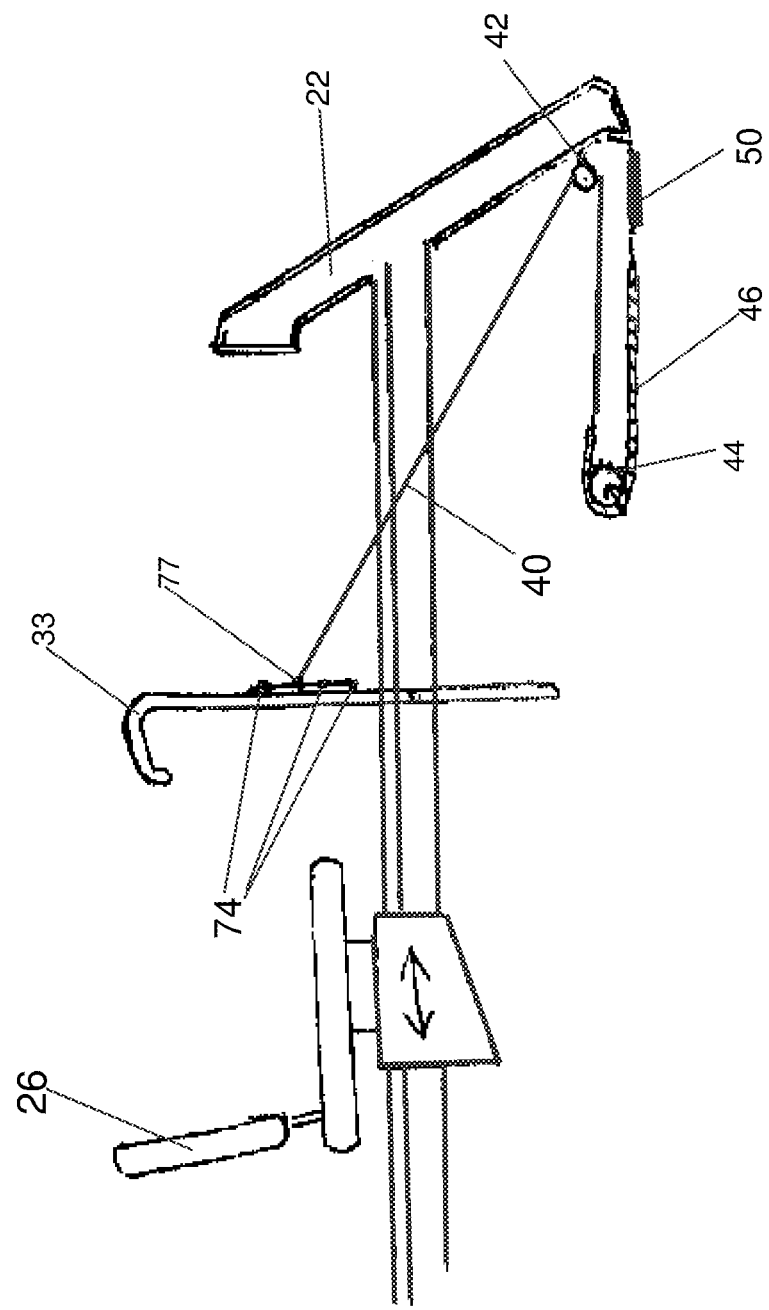
FIG. 4 is a view of the power system of the embodiment of FIG. 1.

FIG. 4 shows how the 3 wheeled vehicle 10 is powered. FIG. 4 shows one side of the power system. Each handlebar 33 or 35 works independent of the other. Thus handlebar 33 works wheel 12 and handle 35 works wheel 14. FIG. 4 shows how handlebar 33 drives wheel 12. The power system for handlebar 35 and wheel 14 works exactly the same as for handlebar 33 and wheel 12. Also the means for adjusting the amount of energy necessary to move the handlebars 33 and 35 works the same for each handlebar 33 and 35.

FIG. 5 shows brake levelers 500 and 502 on the handlebars 33 and 35. The brake lever 500 on the right side handlebar 35 brakes the right side wheel 14. The brake leveler 502 on the left side brakes the left side wheel 12. These are brake levers 500 and 502 can not only be used for braking the 3 wheeled vehicle 10, but also, for helping an individual row the 3 wheeled vehicle 10 up a hill. In a rowing machine the handlebars only deliver power to the wheels when they are being pulled back. When the handlebars of the rowing machine move forward no power is used or delivered. This is exactly what occurs when an individual rows a boat. The oar only produces power when the individual pulls back on the oar. When an individual moves forward with the oars, the oars are out of the water. The same is true about the 3 wheeled vehicle 10. However, to go up a hill and individual needs to apply continuous power or use a brake. For the 3 wheeled vehicle 10 the individual pulls back on the handlebars 33 and 35 propelling the 3 wheeled vehicle 10 forward up the hill. He then puts on the brake 500 and 502 and moves the handlebars 33 and 35 forward. Thus, he keeps the 3 wheeled vehicle 10 from rolling back down hill. He then pulls back again moving the bike further up the hill. He repeats this process until he is to the top of the hill.

The rider can also move up the hill by alternating using the handlebars 33 and 35. He pulls one handlebar 33 or 35 back propelling the 3 wheeled vehicle 10 up the hill. As he moves that handlebar 33 or 35 forward he pulls the other handlebar 33 or 35 back propelling the 3 wheeled vehicle 10 up the hill. The individual can also use the brakes 500 and 502 in this process. Whenever, the individual has fully pulled back one handlebar 33 or 35 he can squeeze the brake 500 or 502 on that handlebar before he begins to pull back the other handlebar 33 or 35. When he does begin to pull back the other handlebar 33 or 35 he releases the brake on the pulled back handlebar 33 or 35 and pushes it forward. This will enable the rider to move up the hill quicker and with less effort.

A power cable 40 is attached to handlebar 33. One end of the power cable 140 has a hook 77 that releasably attaches to the handlebar 33. The handlebar 33 has openings 74 running down the handlebar 33. The hook 77 on the end of a power cable 40 is designed to fit within each of the openings 74. By moving the hook 77 from one opening 74 to another opening 74 one would change the amount of energy necessary to move the handlebar 33 back and forth. Thus, one can increase or decrease one's exercise effort by moving the hook 77 to a different opening 74.

The power cable 40 from handlebar 33 runs to a bumper pulley 42 attached to the bumper 22. The power cable 40 than reverses it direction and runs towards wheel hub 44 in wheel 12 or 14. In the preferred embodiment wheel hub 44 is a three speed bicycle hub. However, this hub could be any type of hub which acts like a bicycle freewheel. The power cable 40 is attached to bicycle chain 46 which encircled wheel hub 44. The end of the bicycle chain 46 not attached to the power cable 40 is attached to a spring 50 which is attached to the bumper 22.

FIG. 2 is a perspective view of another embodiment of the invention. FIG. 2A is a perspective view of the front of the embodiment of FIG. 2. This embodiment as the previous embodiment is a three wheeled vehicle 100. In this embodiment the two wheels 112 and 114 of the three wheeled vehicles are on the back 116. Running down the middle of the three wheeled vehicle is the rail 118. Along the rail 118 is the seat 126. Seat 126 is slideable and attaches to rail 118. As the rail 118 approaches the front 120 of the three wheel vehicle 100, it curves upward over the front wheel 128. The front wheel 128 is attached to rail 118 by a front wheel fork 130. The front wheel fork 130 is similar to a bicycle fork. The front wheel fork 130 extends downward from rail 118 over the front wheel 128.

Figure 2B:
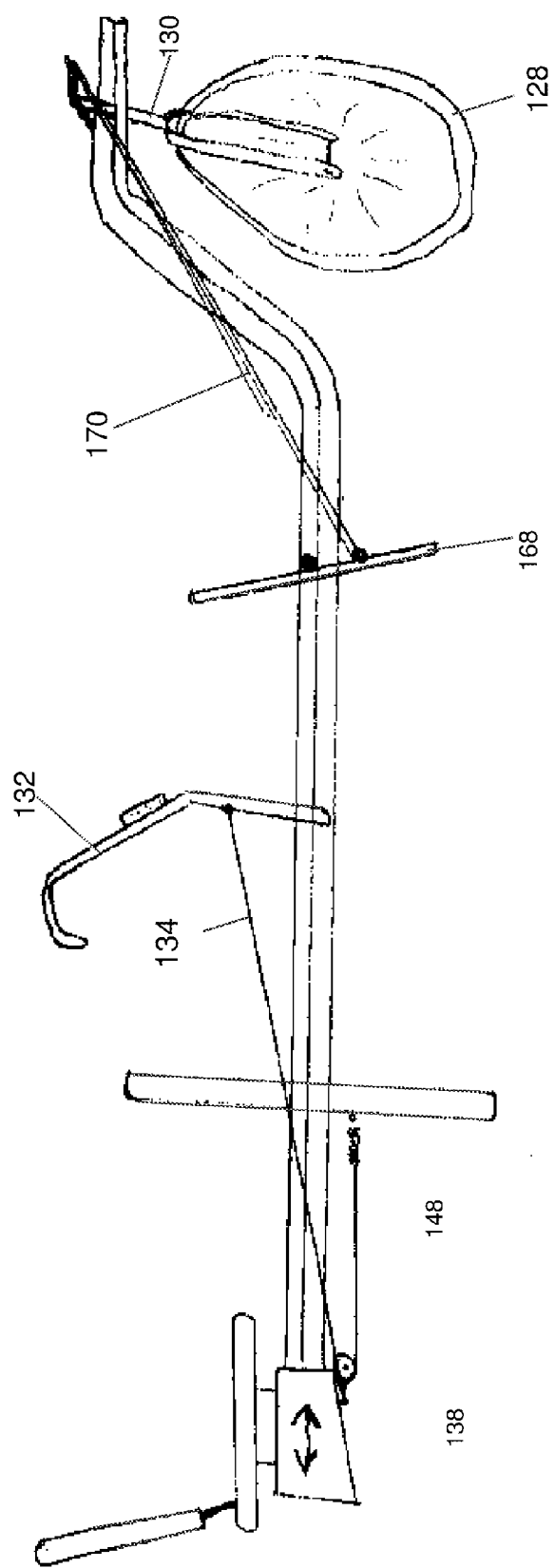
FIG. 2B is a view of the steering system and a view of the system of how the seat and handlebar work together of the embodiment of FIG. 2.

The steering system for the three wheeled vehicle 100 is shown in FIG. 2B. As one moves along rail 118 from the front 120 one finds the front foot rest and steering lever 168. The front foot rest and steering lever 168 is attached to the rail 118 such that it can rotate. Attached to a one end of the foot rest and steering lever 168 is the steering bar 170. Attached to the other end of the steering bar 170 is the front wheel fork 130. The front wheel fork 130 extends through the rail 118 and at the top of the front wheel fork 130 is attached to the steering bar 170 such that when the steering bar 170 moves forward it will turn the front wheel fork 130 which turns the front wheel 128. When the steering bar 170 by the foot rest and steering lever 168 is moved rearward, the steering bar 170 again turns the front wheel fork 130 which turns the front wheel 128. Thus an individual riding the three wheeled vehicle 100 can turns the three wheeled vehicle 100 via the front foot rest and steering lever 168. When the individual moves his right foot forward on foot rest and steering lever 168, steering bar 170 moves forward and turns the front wheel fork 130 which turns the front wheel 128 causing the three wheeled vehicle 100 to turn to the left. When the individual moves his left foot forward on foot rest and steering lever 168, steering bar 170 moves rearwards and turns the front wheel fork 130 which turns the front wheel 128 causing the three wheeled vehicle 100 to turn to the right.

As one moves further along the rail 118 towards the back 116 of the three wheeled vehicle 100, one encounters the movable handlebar set 132. The movable handlebar set 132 is attached to rail 118 in front of seat 126. The moveable handlebar set 132 are attach such that they can move forward towards the front 120 of the three wheeled vehicles 100 and backwards towards the back 116 of the three wheeled vehicle 100. In the preferred embodiment the movable handlebar set 132 are attached to rail 118 by a pivotal bearing 134. As in the previous embodiment the moveable handlebar set 134 is made up of handlebars 133 and 135 which work independent of each other in driving the 3 wheeled vehicle 100.

As one moves further along the rail 118 towards the back 116 of the three wheel vehicle 100 one encounters the seat 126. The seat 126 is slidable attached rail 118. Between the seat 126 and the movable handlebar set 132 is the back piece 122 that is mounted perpendicular to the rail 118. Attached to each end of the back piece 122 is the horizontal piece 172 that runs upward from the back piece 122. Also attached to each end of the back piece 122 is the back wheel suspension bar 152. Both back wheel suspension bars 152 extends rearward from the back piece 122. Attached to the top of each horizontal piece 172 is the back wheel suspension spring 154. Attached across each of the back wheel suspension bars 152 and the back wheel suspension springs 154 is the back wheel suspension bearing bar 156. The back wheel suspension bearing bars 156 are bars that are attached to the back wheel suspension bars 152 via rotating bearings 158. The tops of the back wheel suspension bearing bars 156 are attached to the back wheel suspension springs 154. Attached to the top of the back wheel suspension bearing bars 156 are hub support bearings 160. To each side of the hub support bearings 160 are attached a top hub support piece 162. Attached to each side of the rotating bearings 158 at the bottom of the back wheel suspension bearing bars 156 are the bottom hub support pieces 164. The top hub support pieces 162 and the bottom hub support pieces 164 are long tubes. The ends of each set of bottom hub support pieces 164 and the top hub support pieces 162 are attached to hub lugs 166. The back wheel suspension bearing bar 156, the top hub support piece 162 and the bottom hubs support piece 164 are attach together such as they form a triangle. The top hub support pieces 162 and the bottom hubs support pieces 164 extend out from the sides of the back wheel suspension bearing bars 156. Between the sets of top hub support pieces 162 and bottom hub support pieces 164 the wheel 112 or 114 fits. The wheel hub 144 of wheel 112 or 114 is attached to the three wheeled vehicle 100 via the hub lug 166. The back wheels 112 and 114 of the three wheeled vehicle 100 have the above described suspension so that they will lessen the bumps and holes the three wheeled vehicle 100 may encounter when an individual is using it for exercise.

Figure 4A:
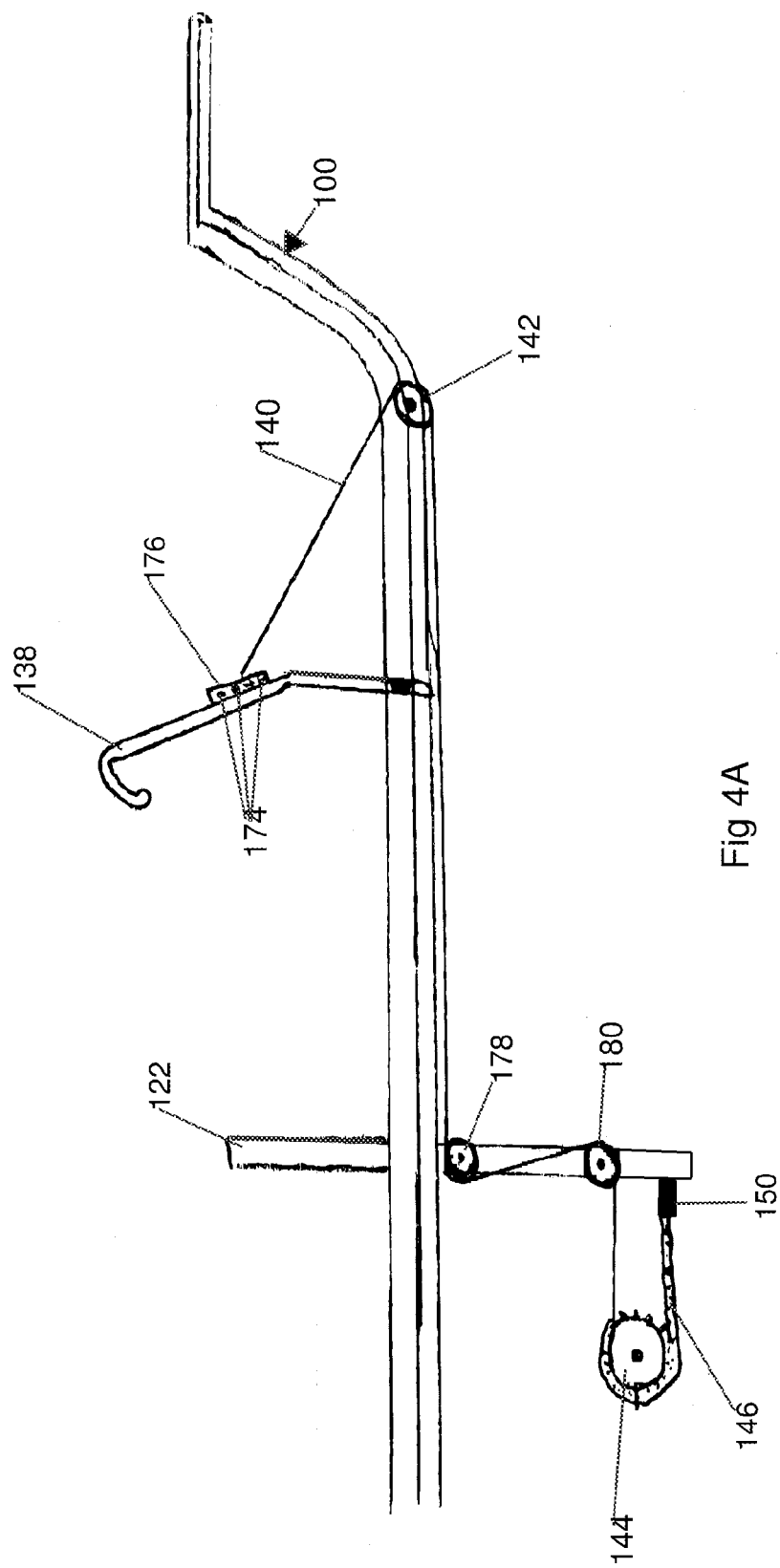
FIG. 4A is a view of the power system of the embodiment of FIG. 2.

FIG. 4A shows how the 3 wheeled vehicle 100 is powered. FIG. 4A shows one side of the power system. Each handlebar 133 or 135 works independent of the other. Thus handlebar 133 works wheel 112 and handlebar 135 works wheel 114. FIG. 4A shows how handlebar 133 drives wheel 112. The power system for handlebar 135 and wheel 114 works exactly the same as for handlebar 133 and wheel 112. Also the means for adjusting the amount of energy necessary to move the handlebars 133 and 135 works the same for each handlebar 133 and 135.

A power cable 140 is attached to the handlebar 133. The power cable 140 has a hook 176 that releasably attaches to the handlebar 133. Handlebar 133 has openings 174 running down the handlebar 133. The hook 176 on the end of a power cable 140 is designed to fit within each opening 174. By moving the hook 176 from one opening 174 to another opening 174 one would change the amount of energy necessary to move the handlebar 133 back and forth. Thus, one can increase or decrease one's exercise effort by moving the hook 176 to different openings.

FIG. 4A shows the power cable 140 runs from handlebar 133 to a rail pulley 142 attached to the rail 118. The power cable 140 then reverses direction and runs to back piece pulley 178. The power cable 140 is then threaded around the back piece pulley 178 and moves towards horizontal piece pulley 180. The power cable 140 then runs towards wheel hub 144 in wheel 112 or 114. In the preferred embodiment wheel hub 144 is a three speed bicycle hub. However, this could be any type of hub that acts like a bicycle free wheel. The power cable 140 is attached to the bicycle chain 146 which encircles a wheel hub 144. The end of a bicycle chain 146 that is not attached to in the power cable 140 is attached to a spring 150 which is attached to the back piece 122. When the handlebar 133 is moved backwards this causes the bicycle chain 146 to move forward and thus causes the wheels 112 or 114 to move forward. When the handlebar 133 is moved forward the spring 150 pulls of the bicycle chain 146 back. This causes a wheel hub 144 to move backwards however, the wheel hub 144 when it moved backwards does not affect the movement of the wheels 112 or 114 since wheel hub 144 is a freewheel.

In FIGS. 2 and 2A one sees at the end the handle 182 of handlebar 133, a gear level 184. This gear level 184 is attached to the three speed bicycle hub 144. When the one clicks the gear lever 184 and changes the gears within the three speed hub 144, this also changes the amount of effort necessary to drive the three wheeled vehicle 100 and the amount of exercise effort. The wheel hub 144 in this embodiment is a three speed hub but it could any speed hub that is known in the art.

As one rides in the three wheeled vehicle one moves the seat 126 and the moveable handlebars 132 back and forth. FIG. 2B shows how the seat 126 and the handlebars 132 are attached by cables to create an exercise device. In FIG. 2B one sees that the moveable handlebars 132 are attached to the seat cable 134. Seat cable 134 runs from the moveable handlebar 132 to the seat 126. The seat cable 134 than encircles a seat pulley 138 located under the seat 126. The seat cable 134 then reverses itself and runs to compression spring 148 which is attached to the back piece 122. This arrangement allows the seat 126 and the handlebars 132 to work together.

Figure 6:
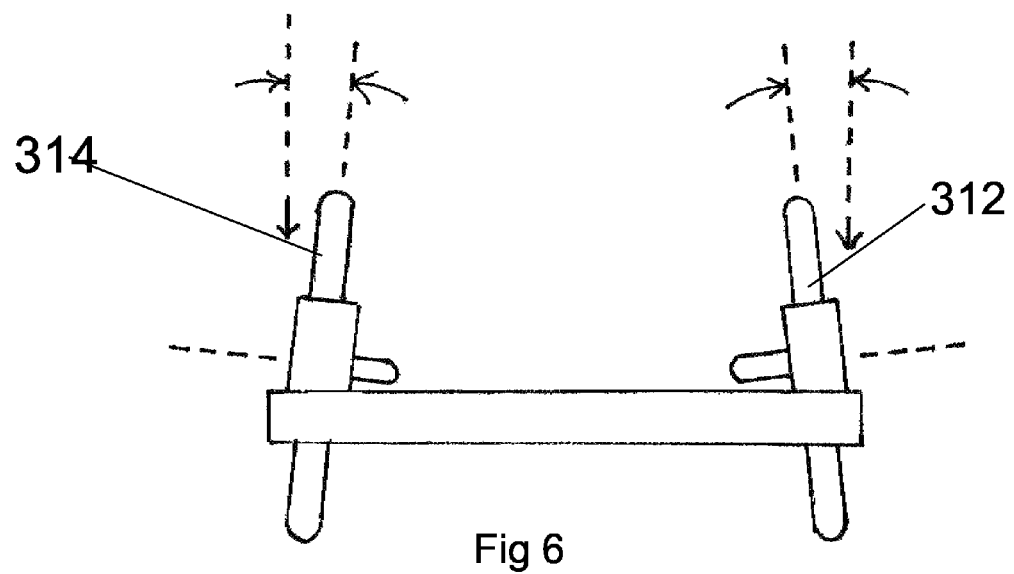
FIG. 6 is a front view of the front end of the invention showing the tilting of the wheels.

FIG. 6 shows another embodiment of the invention. In this embodiment the wheels 312 and 314 are angled in by 8°. The embodiment in which there are two rear wheels the wheels can also be angled inward. The tricycle becomes more stable by angling inward the set of two wheels 312 and 314. Thus the inventor can produce an embodiment in which the two wheels 312 and 314 are set closer together and still keep sufficient stability that the invention can be propelled down a road. Applicant has been able to place the wheels 312 and 314 close enough together that they can get through a normal size door and still keep the tricycle stable for riding outdoors.

Figure 7:
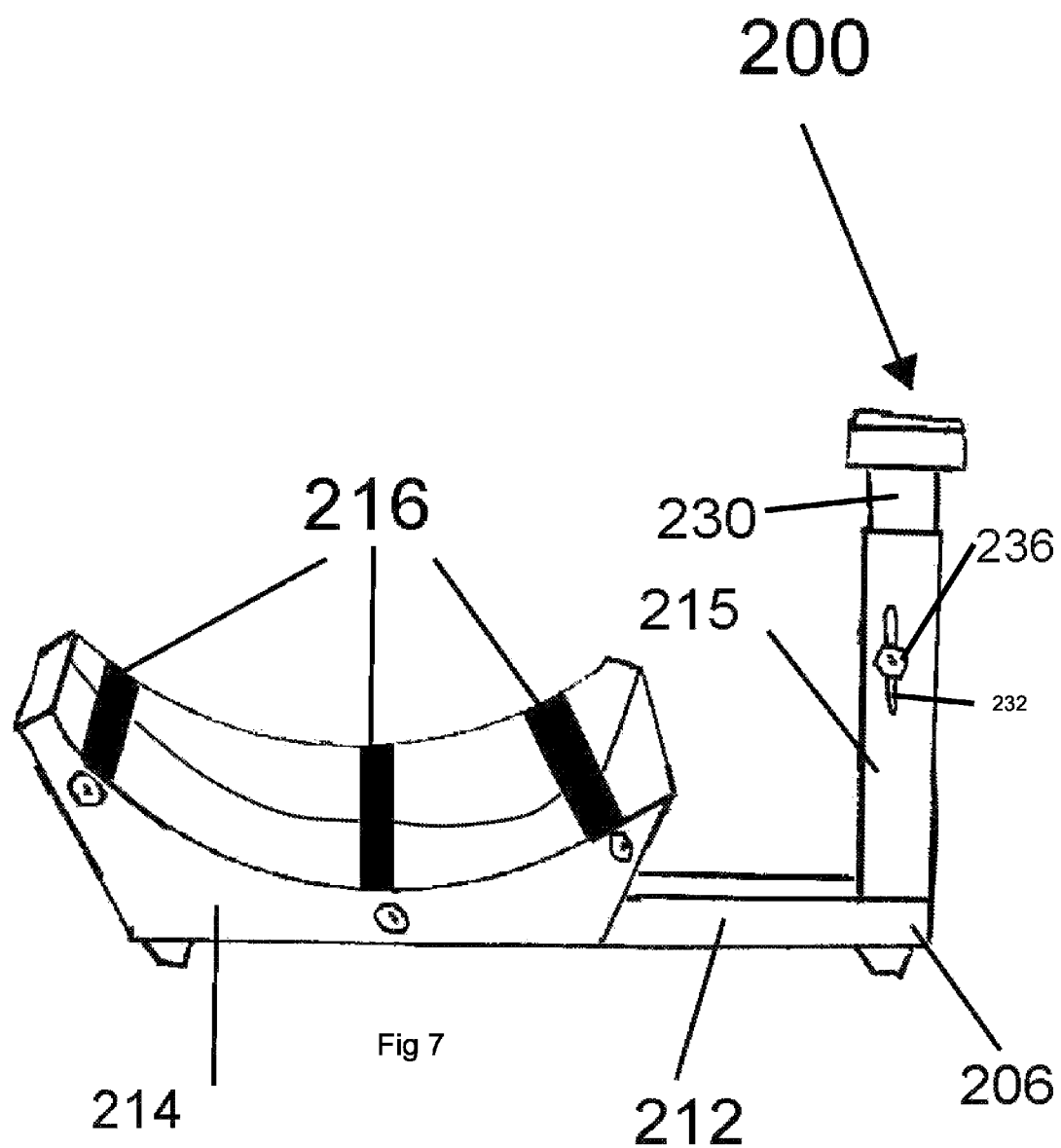
FIG. 7 is a side view of the stand.
Figure 7A:
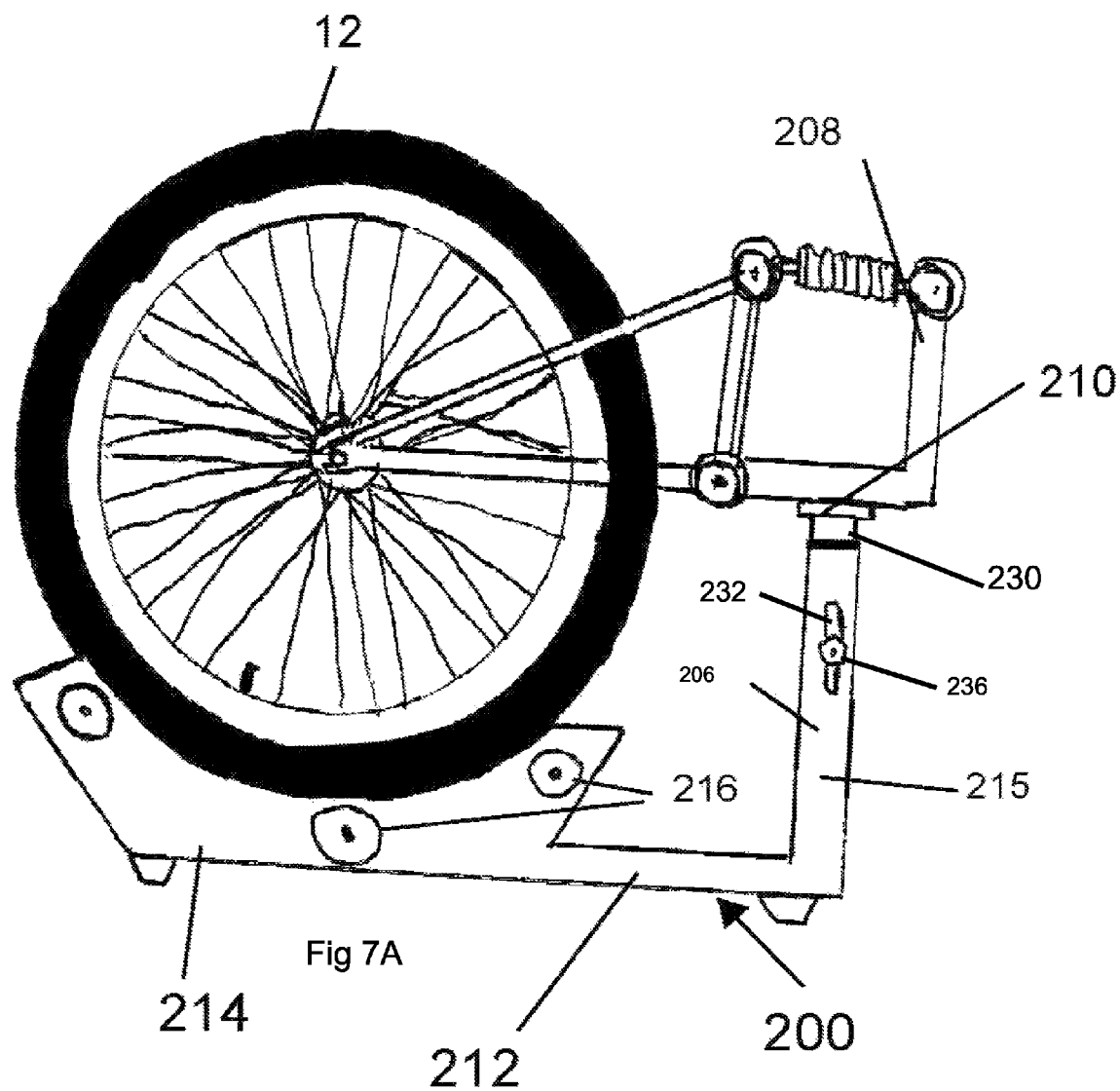
FIG. 7A is a side view of the stand with the invention in place.

The tricycle can also be ridden indoors. To do this the inventor has invented a stands 200. Stand 200 fits under each of the two driven wheel sets 12 and 14 or 112 and 114 or 312 and 314. The stand 200 is shown in FIGS. 7 and 7A. FIGS. 7 and 7A show an L shaped bar 206. On the top of the L-shaped bar 206 is a pad 210. The bike's frame 208 is placed upon this pad 210, as shown in FIG. 7A. Attached to the horizontal extension 212 of the L-shaped bar 206 is a wheel trough 214. The wheel trough 214 is designed such that one wheel of the two driven wheel set 12 and 14 or 112 and 114 or 312 and 314 will fit within each wheel trough 214. Within the wheel trough 214 are three rollers 216 that are set in a concave configuration. The two driven wheels set of wheels 12 and 14 or 112 and 114 or 312 and 314 of the tricycle are placed within the wheel troughs 214 and fits up against the three rollers 216. When the wheels of the two driven wheeled set 12 and 14 or 112 and 114 or 312 and 314 revolve, the wheels 12, 14, 112, 114, 312, and 314 will rotate the rollers 216 in the wheel troughs 214. This will enable an individual to exercise with the invention in his home without rolling around.

The rollers 216 in the wheel trough 214 produce resistance against the two driven wheel set 12 and 14 or 112 and 114 or 312 and 314 which enables an individual to get exercise when they use the invention indoors. The rollers 216 are the designed such that when the two driven wheel set 12 and 14 or 112 and 114 or 312 and 314 are placed upon the rollers 216 the weight of the two driven wheel set 12 and 14 or 112 and 114 or 312 and 314 increases the rollers' 216 resistance. Thus, the resistance of the rollers 216 can be controlled by the amount of weight placed upon the rollers 216. The inventor has used this feature of the rollers 216 to enable the user to vary the resistance when the user is working out inside. When the two driven wheel set 12 and 14 or 112 and 114 or 312 and 314 is placed in the wheel troughs 214 the weight of the two driven wheel set 12 and 14 or 112 and 114 or 312 and 314 and the frame 208 puts pressures on the rollers 216 and increases the rollers 216 resistance. When the two driven wheel set 12 and 14 or 112 and 114 or 312 and 314 is placed in the wheel trough 214, the frame 208 fits on top of pad 210 on vertical extension 215 of L shaped bar 206. Thus, the frame 208 rest upon the vertical extension 215 of the L shaped bar 206 and the other end of the frame rest upon the single wheel 28.

The vertical extension 215 of the L-shaped bars 206 can be adjusted upward or downward to change the residence of the rollers 216. By adjusting the frame 208 upward less pressure is placed on the rollers 216 and the rollers 216 and the wheels 12, 14, 112, 114, 312, and 314 spin more freely. By adjusting the frame 208 downward more pressure is placed on the rollers 216 and the rollers 216 and the wheels 12, 14, 112, 114, 312, and 314 have more resistance. The vertical extension 215 is a tube. Within the vertical extension 215 another tube 230 is place. The vertical extension 215 has a slot 232 along the vertical extension's 215 side. The other tube 230 has a threaded opening 234. A knob 236 with a bottom screw is run through the slot 232 and is threaded into the threaded opening (not shown). By tightening and loosening the knob 236 and lifting the other tube 230 the heights of the vertical extension 215 can be adjusted. When the other tube 230 is lifted upward the pressure on the rollers 216 is decreased which allows the wheels 12, 14, 112, 114, 312, and 314 to spin more freely. When the other tube 230 is adjusted downward the pressure on the rollers 216 is increased which creates more resistance on the spinning of the wheels 12, 14, 112, 114, 312, and 314.

Two wheel troughs 214 can be designed as single piece. In this embodiment the wheel troughs 214 will be made exactly as in the previous embodiment except there will be a center piece 204. The wheel troughs 214 are attached to the ends of the center piece 204. The center piece's 204 length is the length that enables the wheel troughs 214 to align with the two driven wheel set 12 and 14 or 112 and 114 or 312 and 314. The invention is placed upon the wheel troughs 214 just as the pervious embodiment and the resistance on the rollers 216 is adjusted as in the previous embodiment.

With the stand 200 the invention can now be ridden inside. To ride the invention inside, the will troughs 214 are placed under the two driven wheel sets 12 and 14 or 112 and 114 or 312 and 314. The height of the vertical extension 215 is adjusted for the level of resistance. Then one sits on the seat 26 or 126 and begins to row.

The three wheeled vehicle 10 contains a device with a screen 505 for measuring the individuals exercise progress. This can be done in numerous ways. When using the three wheeled vehicle 10 outside the device 505 can attach to the Internet and use GPS to track the three wheeled vehicles 10 route. Thus, an individual in this way could keep track of the distance and the time they traveled. Also with the use of the Internet one can measure the incline of the roads over which traveled and the wind velocity and direction. Thus an individual using the three wheeled vehicle 10 could get a very accurate calculation of the amount of energy used in the workout. For indoors the device 505 would be attached to a measuring device that could measure the speed and distance the wheel 12, 14, 112, 114, 312, and 314 turns. This information could be used with the knowledge of the resistance on the rollers 216 to give an accurate calculation of the energy used during the workout.

I claim:
1. An exercise vehicle comprising:
   a. a frame; and,
   b. wheels with a set of two drive wheels either in the front or back attached to the frame; and,
   c. a movable seat attached to the frame designed to carry an individual; and,
   d. moveable handle bars; and,
   e. a means to powering the vehicle that drives the wheels through the movement of the handlebars; and, f. a cable means attached to the seat to allow the seat to work in conjunction with the handlebars to provide power for the vehicle; and,
g. a means for steering the vehicle attached to the frame; and,
h. a stand that fits under the set of two drive wheels of the exercise vehicle and allows the wheels to turn without the vehicle moving; and,
i. the stand comprises:
  1. two L shaped bars that have a horizontal extension that sits on a floor and a vertical extension; and
  2. a pad that sits on top of each L shaped bar's vertical extension; and,
  3. a wheel trough that is attached to the horizontal extension of each of the L shaped bars; and,
  4. a set of rollers attached to the wheel trough; and,
  5. the rollers are attached to the wheel trough in a concave configuration such that the wheel when placed in the wheel trough make contact with the rollers; and
  6. whereas the vehicle frame is placed on top of the pad and the wheels are placed within the wheel trough.

2. An exercise vehicle as in claim 1 further comprising:
h. the set of two drive wheels are slanted inward with a top of the wheels closer together than a bottom of the wheels to increase stability.

3. An exercise vehicle as in claim 2 wherein:
a. the vehicle has three wheels which include the set of two drive wheels.

4. An exercise vehicle as in claim 2 wherein:
a. the set of two drive wheels slant in by 8 degrees.

5. An exercise vehicle as in claim 2 further comprising:
a. the wheels are comprised of four wheels which include said set of two drive wheels set of two drive wheels and a set of two wheels.

6. An exercise vehicle as in claim 5 wherein:
a. the wheels within each set are slanted inward with a top of the wheels closer together than a bottom of the wheels to increase stability.

7. An exercise vehicle as in claim 6 wherein:
a. the wheels within each set slant in by 8 degrees.

8. An exercise vehicle as in claim 1 wherein:
a. the handlebars are positioned such that the handlebars extend upward and a vehicle drivers legs are positioned between the handlebars when a driver sits in the seat and uses the vehicle.

9. An exercise vehicle as in claim 1 wherein: a bar that attaches the two L shaped bars and the bars length is approximately a width between the two drive wheels of the vehicle and when the frame of the vehicle is placed upon the pads, the drive wheels fit within the wheel trough.

10. An exercise vehicle as in claim 1 wherein:
a. the set of rollers produce resistance to the turning of the drive wheels according to the amount of weight placed upon the rollers.

11. An exercise vehicle as in claim 10 wherein:
a. the vertical extension of the L shaped bar is adjustable in height.

12. An exercise vehicle as in claim 11 wherein:
a. the vertical extension comprises:
  1. a vertical extension tube with a vertical slot; and,
  2. a second tube that fits within the vertical extension tube;
  and,
  3. a thread opening in the second tube;
  4. a knob with a threaded bottom that fits through the slot and within the thread opening; and,
  5. whereas the height on the vertical extension can be changed by loosening the knob and moving the second tube up or down in the slot and then tightening the knob.

13. An exercise vehicle as in claim 11 wherein:
a. the amount of weight upon the rollers can be changed when the vehicle is on the stand by raising and lowering the height of the vertical extension.

14. An exercise vehicle as in claim 1 further comprising:
a. a device with a screen for measuring the driver of the vehicle progress exercising.

15. An exercise vehicle as in claim 14 wherein:
a. the device has functions that are selected from a group consisting of GPS, distance traveled, time, energy used, and internet connection.

* * * * *